United States Patent [19]
Duncan et al.

[11] Patent Number: 6,052,097
[45] Date of Patent: Apr. 18, 2000

[54] ANTENNA CIRCUIT AND METHOD FOR COLLAR-MOUNTED REMOTE ANIMAL TRAINING SYSTEM

[75] Inventors: Timothy T. Duncan; Paul A. Kurimsky; Fransisco J. Napolez, all of Tucson, Ariz.

[73] Assignee: Tri-Tronics, Inc., Tucson, Ariz.

[21] Appl. No.: 09/034,451

[22] Filed: Mar. 4, 1998

[51] Int. Cl.[7] .................................................. H01Q 7/08
[52] U.S. Cl. .......................... 343/788; 343/718; 343/728; 343/895
[58] Field of Search .................................... 343/787, 788, 343/725, 726, 728, 729, 702, 715, 895, 900, 718; H01Q 7/08

[56] References Cited

U.S. PATENT DOCUMENTS

| | | | |
|---|---|---|---|
| H1588 | 9/1996 | Arney | 343/715 |
| 3,087,117 | 4/1963 | Mitchell | 325/118 |
| 3,438,046 | 4/1969 | Menhennett | 343/895 |
| 3,789,418 | 1/1974 | Reiber et al. | 343/872 |
| 3,942,432 | 3/1976 | Cantine, Jr. et al. | 100/53 |
| 4,435,713 | 3/1984 | Gasparaitis et al. | 343/702 |
| 4,794,402 | 12/1988 | Gonda et al. | 343/895 |
| 4,802,482 | 2/1989 | Gonda et al. | 119/29 |
| 4,805,232 | 2/1989 | Ma | 343/788 |
| 5,054,428 | 10/1991 | Farkus | 119/29 |
| 5,084,710 | 1/1992 | Whittington | 343/876 |
| 5,099,797 | 3/1992 | Gonda | 119/29 |
| 5,144,325 | 9/1992 | Kurcbart | 343/718 |
| 5,193,484 | 3/1993 | Gonda | 119/29 |
| 5,229,784 | 7/1993 | Jones | 343/888 |
| 5,392,056 | 2/1995 | DeTeso | 343/873 |
| 5,453,019 | 9/1995 | Garver et al. | 439/188 |
| 5,604,972 | 2/1997 | McCarrick | 29/600 |
| 5,605,116 | 2/1997 | Kim et al. | 119/720 |
| 5,748,154 | 5/1998 | Yokota | 343/702 |

*Primary Examiner*—Don Wong
*Assistant Examiner*—Hoang Nguyen
*Attorney, Agent, or Firm*—Cahill & Sutton & Thomas P.L.C.

[57] ABSTRACT

An improved antenna system for a collar-mounted receiver-stimulator unit of an electronic animal training apparatus includes a conductive antenna mounting connector for detachable connection of an external flex antenna to the receiver-stimulator unit, a ferrite core, and a first winding on the ferrite core is coupled to a receiver circuit of the receiver-stimulator unit, and constitutes an internal ferrite antenna thereof. A second winding on the ferrite core is connected to the antenna mounting conductor and coacts with the first winding to function as a matching transformer between a receiver antenna input terminal and an external high flex antenna connected to the antenna mounting connector. The longitudinal axis of the ferrite core is co-planar with a longitudinal axis of the flex antenna.

18 Claims, 5 Drawing Sheets

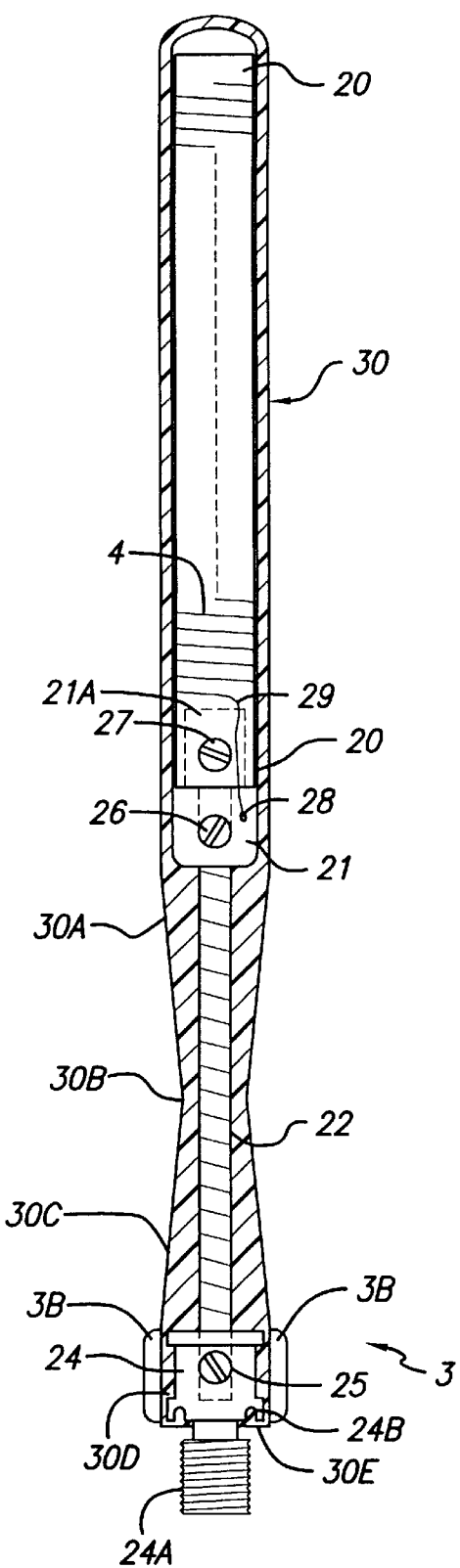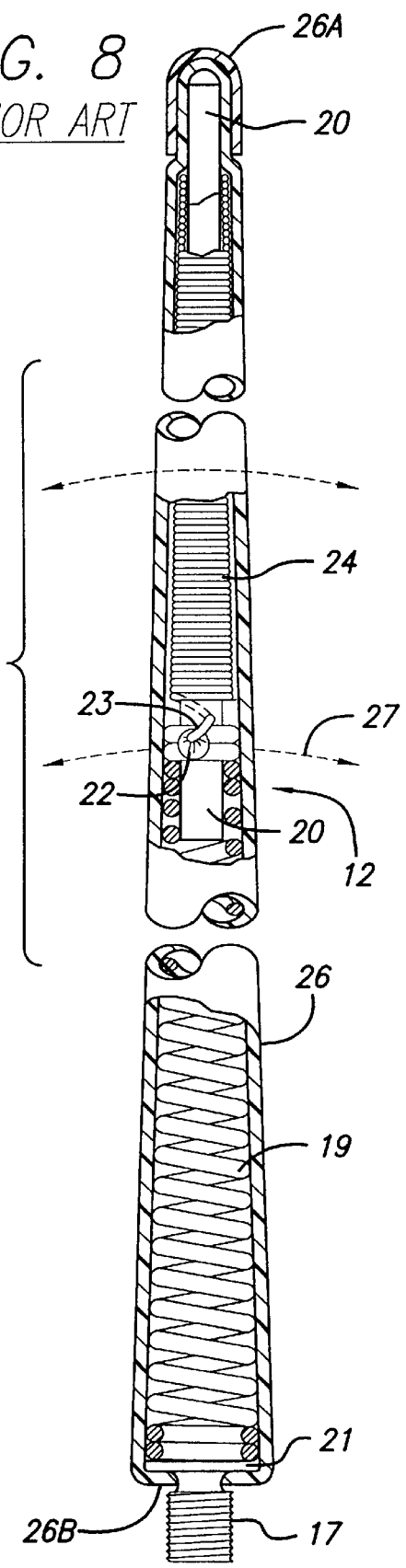
FIG. 6
FIG. 8
PRIOR ART

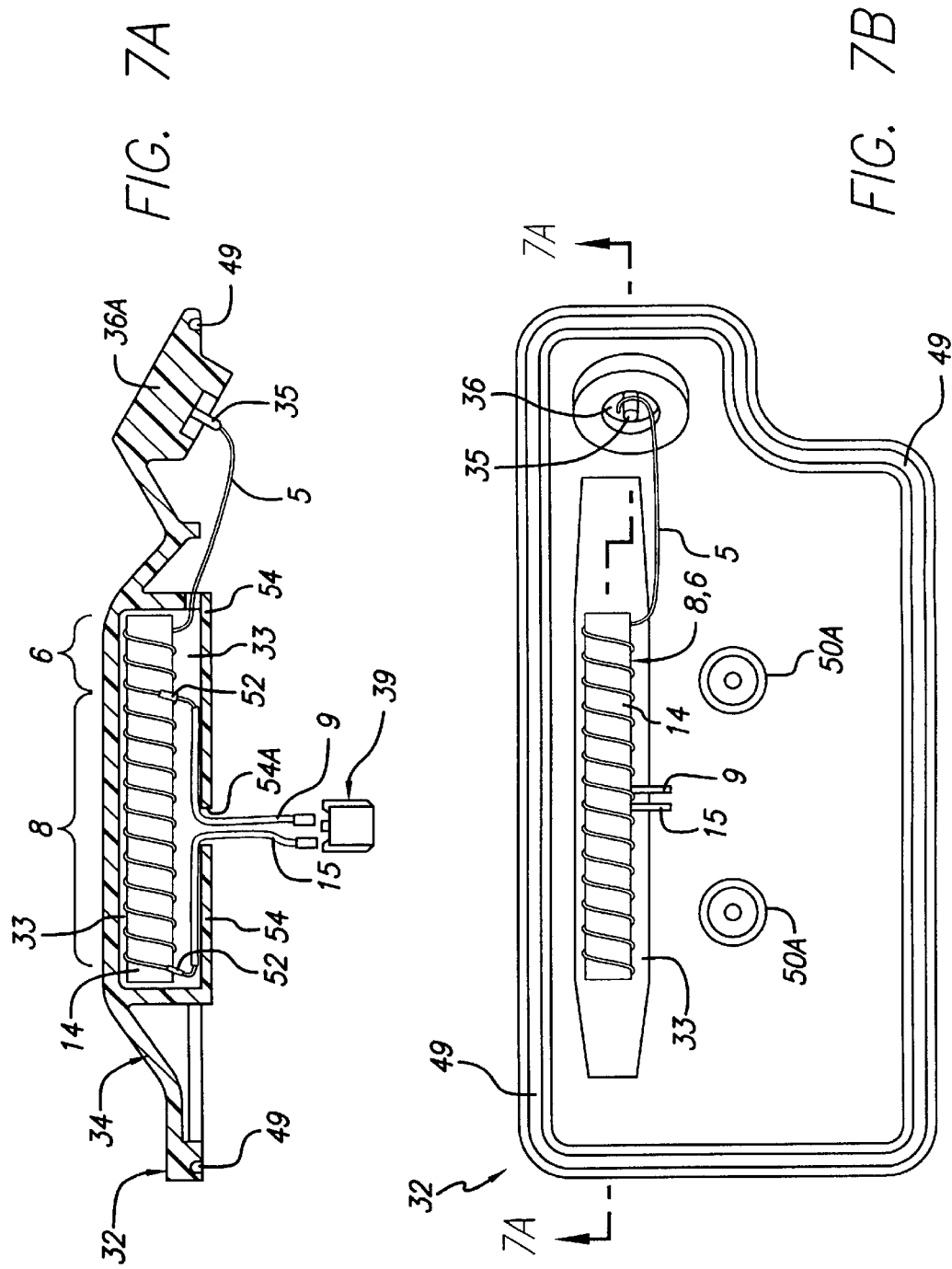

ANTENNA CIRCUIT AND METHOD FOR COLLAR-MOUNTED REMOTE ANIMAL TRAINING SYSTEM

BACKGROUND OF THE INVENTION

The invention relates to improved circuitry and antenna structures and methods for a remotely controlled collar-mounted animal training system, and more particularly to improvements therein which avoid potential damage to the animal training system due to rough usage, allow optional use of an external flex antenna, easy use of the system, and improve its overall reliability.

U.S. Pat. No. 4,794,402 (Gonda et al.), U.S. Pat. No. 5,054,428 (Farkus), U.S. Pat. No. 4,802,482 (Gonda et al.), all incorporated herein by reference, are generally indicative of the state of the art for collar-mounted animal training devices.

FIG. 8, labeled "prior art", is a reproduction of FIG. 4 of the above mentioned '402 patent by Gonda et al.; note that the same reference numerals are retained from the '402 patent. It shows a flexible top-loaded flex antenna structure having a rigid upper winding 24 wound on a stiff support. The winding 24 is electrically connected to a conductive coil spring 19 which connects the upper winding 24 to a threaded conductive base 17. The conductive base 17 can be screwed into a conductive mounting base on a collar-mounted receiver. When a large, strong dog wearing the collar-mounted receiver unit is rushing through brush, briar patches and the like in a training situation, the flex antenna may be subjected to a great deal of stress and torque. As a result, the assignee has found that a solder connection 22 connecting the winding 24 to the coil spring 19 may weaken and eventually break. Furthermore, the flex antenna may become unscrewed from the mounting base, and hence lost, as a result of torque applied thereto when the flex antenna rubs against a branch of a tree or large bush as the dog runs past or through it. Also, the plastic sheath 26 often is torn off of the flex antenna as the dog runs through brush. Another common problem is that one dog chews on the external antenna carried by another dog. In some cases, the life of a flex antenna can be as short as a few weeks, after which it must be replaced, at substantial cost.

In view of the foregoing, it can be appreciated that there are training situations in which it would be desirable to not have an external antenna at all in order to avoid the above described damage that is frequently caused to external flex antennas of a remote controlled receiver unit carried by a large dog. Some of the assignee's collar-mounted remote training devices therefore include only an internal ferrite antenna, which typically provides a range of approximately 0.5–0.7 mile.

Dogs being trained by professional trainers frequently become wet during training exercises, as a result of rain or from jumping into a creek or marsh or the like. If the flex antenna of a collar-mounted training device such as the one shown in prior art FIG. 8 absorbs water or allows leakage into the internal structure of the antenna, the water can cause corrosion of the antenna connections and can also cause "de-tuning" of the receiver, causing the receiver unit to suddenly become "out of range" of the remote transmitter being operated by the trainer. Intermittent internal connections of a external flex antenna can be very problematic by making it difficult to know when a flex antenna needs to be replaced. Intermittent training signals and associated training stimulus interrupt the training process and confuse both the trainer and the animal and hence are exceedingly counterproductive.

Although the products marketed by the assignee which are generally disclosed in the above patents have proven to be reliable, efficient, and inexpensive, it nevertheless would be desirable to provide improved collar-mounted animal training systems which are more reliable and less subject to physical damage as a result of the vigorous behavior of dogs during training exercises.

SUMMARY OF THE INVENTION

Accordingly, it is an object of the invention to provide a more reliable antenna circuit and structure for a collar-mounted animal training system than has previously been available.

It is another object of the invention to provide a collar-mounted animal training receiver antenna system which can function in one mode for short range training exercises without use of an external flex antenna, and also has an extended range mode wherein a detachable flex antenna is used.

It is another object of the invention to provide a receiver antenna system which can function in one mode for short range without use of an external flex antenna, and also has an extended range mode wherein a detachable flex antenna is used.

It is another object of the invention to provide an improved flex antenna for a collar-mounted receiver-stimulator unit, wherein the flex antenna is less susceptible to having a protective sheath partly or fully torn off as a result of rough behavior of dogs during training exercises.

It is another object of the invention to avoid the need to frequently replace damaged or lost external flex antennas of a collar-mounted remote training receiver.

It is another object of the invention to provide an easily manufactured flex antenna system for a remotely controlled collar-mounted animal training receiver.

Briefly described, and in accordance with one embodiment thereof, the invention provides an improved antenna system for an electronic animal training apparatus including a collar-mounted receiver, a conductive antenna mounting connector for detachable connection of an external flex antenna to the receiver, a ferrite core, a first winding (8) having a first number of turns about the ferrite core, a first terminal coupled to an antenna input terminal of the receiver, and a second terminal coupled to the first ground conductor, a second winding (6) having a second number of turns about the ferrite core, a first terminal coupled to the conductive antenna mounting connector, and a second terminal coupled to a second ground conductor, wherein the first winding (8) functions as a ferrite antenna and the first and second windings together function as a matching transformer coupled between the receiver antenna input terminal and an external antenna connected to the antenna mounting connector. In one embodiment, the first and second ground conductors are electrically connected together. The second winding overlaps a portion of the first winding. The longitudinal axis of the ferrite core is co-planar with a longitudinal axis of the flex antenna.

In one embodiment, the external antenna includes a conductive mounting element (24) having a conductive connecting/disconnecting structure (24A) for connecting and disconnecting the flex antenna to and from a mounting connector of the receiver-stimulator (16), a piece of conductive flex cable (22) having a first end and a second end, the first end being rigidly attached to the conductive mounting element (24), a conductive coil support (21) having a first end rigidly attached to the second end of the piece of conductive flex cable, and a second end, an insulative rod (20) having a first end rigidly attached to the second end of the conductive coil support (21), and a second end, an antenna coil wire (4) wound about the insulative rod (20) and having a free end located near the second end of the insulative rod, and a connected end located near the first end of the insulative rod and electrically attached to the conductive coil support (21), and a molded insulative waterproof sheath disposed on the entire flex antenna except the conductive connecting/disconnecting structure (24A). The sheath (30) includes a cylindrical first portion of a first diameter disposed around the conductive coil support (21), the insulative rod (20), and the antenna coil wire (4), and a second portion of diameter which gradually decreases from the first diameter to a second diameter and then increasing to a third diameter, the second diameter being generally at a midpoint of the flex cable to confine flexing thereof generally to the midpoint of the flex cable.

The receiver-stimulator unit includes a metal container (46) having a receiver circuit therein, the metal container having an open top, a plastic cover (32) attached to cover the open top, the plastic cover having therein an elevated recess (34) disposed substantially above an upper edge of the metal container, and a ferrite antenna including a ferrite core (14) and a first winding (8) having a first number of turns about the ferrite core and first (9) and second (15) terminals coupled to first and second terminals of the receiver circuit. A conductive antenna mounting connector (36) is provided for detachable connection of an external flex antenna (3) to the receiver-stimulator unit (16). A second winding (6) on the ferrite core having a first terminal (5) coupled to the conductive antenna mounting connector and a second terminal coupled to the second terminal (15) of the first winding functions as a matching transformer coupled between the ferrite antenna and an external high (Q) flex antenna (3) connected to the antenna mounting connector.

BRIEF DESCRIPTION OF THE DRAWINGS

FIG. 6 is a section view of the improved external flex antenna shown in FIG. 1.

FIG. 7A is a section view, taken along section line 7A—7A of FIG. 7B, of a plastic cover for the metal housing of the collar-mounted receiver-stimulator unit shown in FIG. 1, with an internal ferrite antenna in an elevated recess of the plastic cover.

FIG. 7B is a bottom plan view of the plastic cover shown in FIG. 7A.

FIG. 8 is a partial cutaway elevation view of a prior art flex antenna.

DETAILED DESCRIPTION OF THE PREFERRED EMBODIMENT

Figure 1:
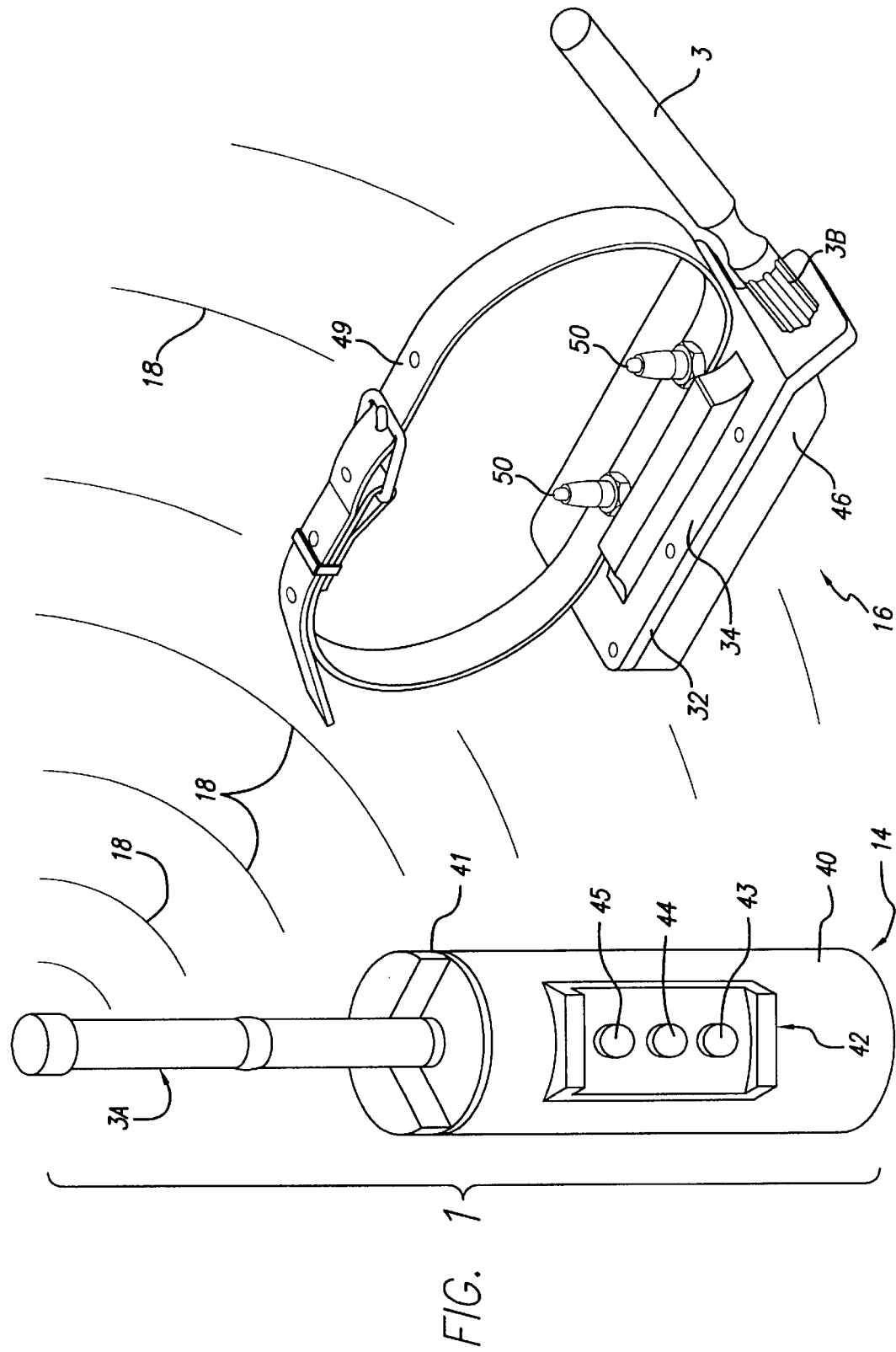
FIG. 1 is a perspective diagram of an animal training system of the present invention, including a collar-mounted, remotely controlled receiver-stimulator unit.

Referring now to FIG. 1, collar-mounted receiver-stimulator unit 16 includes a magnesium metal (Type AZ91D) housing 46 in which batteries and a stimulator circuit are mounted. The housing 46 is composed of magnesium to provide both light weight and structural strength to withstand the rough treatment to which receiver stimulator unit 16 often is subjected. Collar-mounted stimulator-receiver unit 16 includes a plastic cover 32 having an elevated chamber 34 in which an internal ferrite antenna 8 (FIG. 4), subsequently described, is mounted. A removable, inclined external flex antenna 3, subsequently described, is attached on the right side of the receiver-stimulator unit 16 as shown, generally in accordance with the teachings of the above mentioned U.S. Pat. No. 4,794,402. Ribs 3B, which are molded with the plastic sheath or coating 30 (FIG. 6), allow hand tightening/removal of flex antenna 3 while avoiding damage to the internal structure thereof. A pair of stimulus electrodes 50 extend upward from conductive mounting elements 50A (FIG. 7B) on plastic cover 32 and also from the lower inner surface of collar 49. Electrodes 50 receive the high voltage output carried by conductors 55 (FIG. 4) of the stimulus circuit in housing 46.

Rf wavefronts 18 are sensed by the external flex antenna 3 and/or the internal ferrite antenna 8 and decoded to obtain commands transmitted by a hand-held remote transmitter 14. Transmitter 14 has a body 40 that includes transmitter circuitry and batteries. An external antenna 3A is mounted on the top of body 40 and is electrically coupled to the transmitter circuitry therein. The intensity of the desired electrical stimulus to the animal is controlled by depressing buttons 43, 44, and 45, generally in accordance with the teachings of the above mentioned U.S. Pat. No. 4,802,482.

Button guard 42 is disposed on the outer cylindrical surface of body 4. A removable audio tone module 41 having a control button (not shown) on the back face thereof allows audio tone signals to be produced by a speaker or piezo-electric transducer on the collar-mounted receiver-stimulator unit 16.

Figure 2:
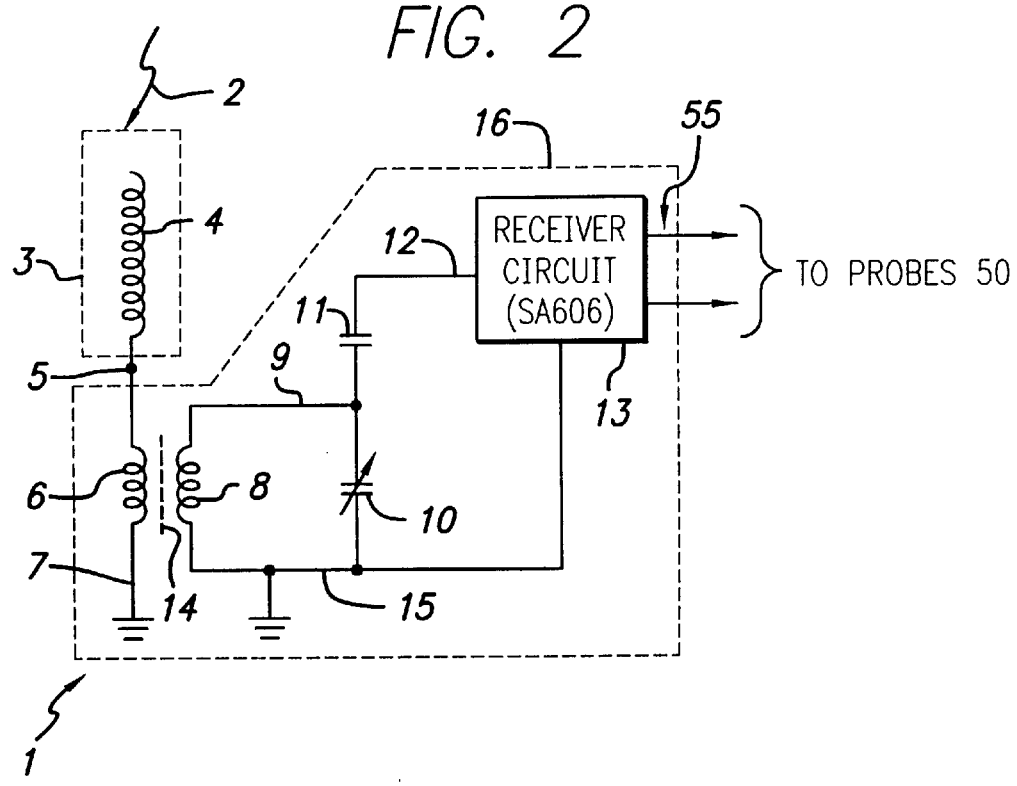
FIG. 2 is a schematic circuit diagram illustrating the receiver, internal ferrite antenna, and an external flex antenna of the collar-mounted receiver-stimulator unit shown in FIG. 1.

Referring to FIG. 2, collar-mounted receiver-stimulator unit 16 has attached thereto an external flex antenna 3, which may be generally similar to the one shown in U.S. Pat. No. 4,794,402 or the flex antenna shown in FIG. 6. Numeral 2 designates a rf radio signal produced by a remote transmitter (not shown) to produce a desired electrical stimulus to the neck of the dog in accordance with common training procedure. The external flex antenna 3 includes a top-loaded coil 4, a terminal 5 of which is connected to one terminal of a second coil 6 located inside collar mounted receiver-stimulator unit 16. The other terminal 7 of coil 6 is connected to an electrical ground 15 inside the receiver-stimulator unit 16.

The housing of the receiver-stimulator unit 16 has a plastic cover in which a ferrite antenna 8 is embedded. Ferrite antenna 8 has a ferrite core indicated by dotted line 14 and functions as a short range antenna if the external flex antenna 3 is removed. If flex antenna 3 is removed, a protective plug is placed in the conductive mounting base (FIG. 7B) from which the flex antenna is removed). In a product recently developed by the assignee, the effective range of the receiver-stimulator unit 16 is approximately one-half mile from the transmitter. If the external flex antenna 3 is attached, then the range is extended to more than a mile. Thus, if the training exercise allows the trainer to stay within one-half mile of the dog wearing the collar-mounted receiver, no external flex antenna 3 is required, so antenna damage caused by rough behavior of the dog is avoided. Costly replacement of a damaged or lost flex antenna 3 therefore also is avoided.

Figure 3:
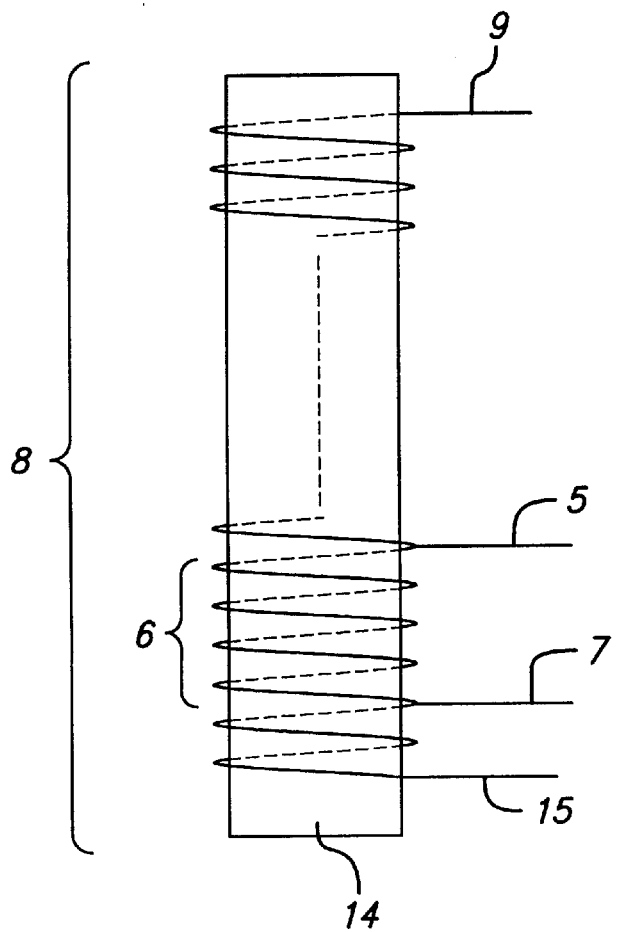
FIG. 3 is a side elevation diagram of the internal ferrite antenna of the collar-mounted receiver-stimulator unit 8 shown in FIG. 2.

In FIG. 2, coil 6 consists of additional windings about ferrite core 14, as shown in FIG. 3. Thus, when flex antenna 3 is attached, ferrite antenna 8 and coil 6 together act as a matching transformer between receiver circuit 13 and flex antenna 3. The high Q characteristic of flex antenna 3 and the low Q characteristic of ferrite antenna 8 make this practical. (Receiver circuit 13 is connected by conductors 55 to stimulus probes 50, generally in accordance with above mentioned U.S. Pat. No. 4,794,402.

Figure 4:
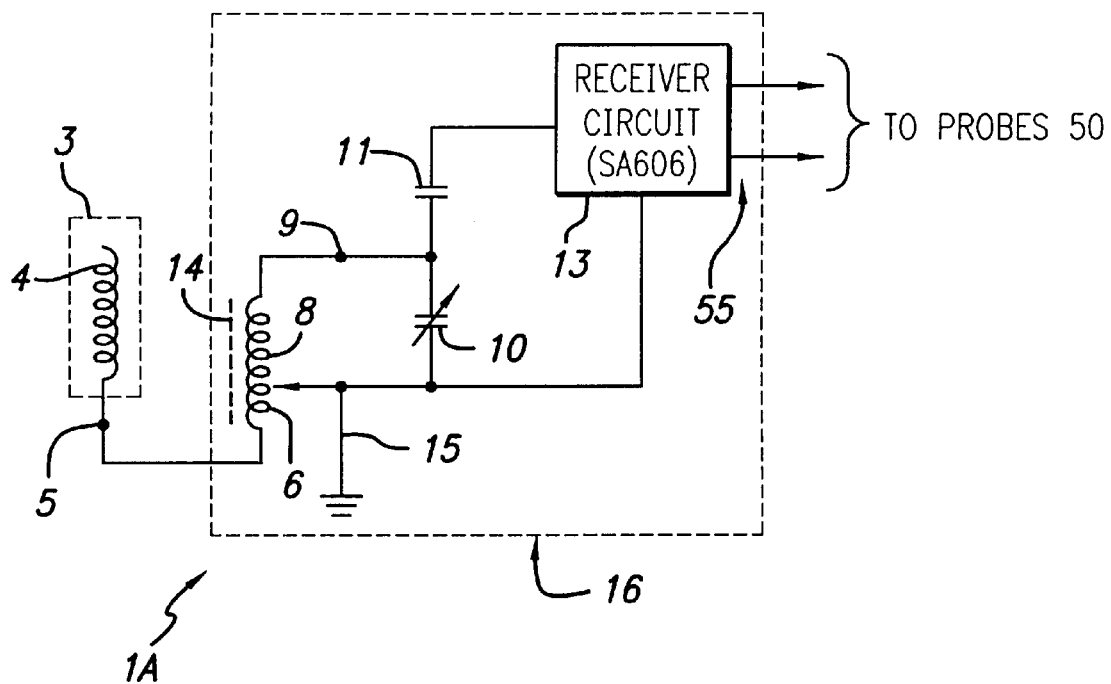
FIG. 4 is a schematic diagram of another embodiment of the receiver, internal ferrite antenna, and external flex antenna of the collar-mounted receiver-stimulator unit of FIG. 1.
Figure 5:
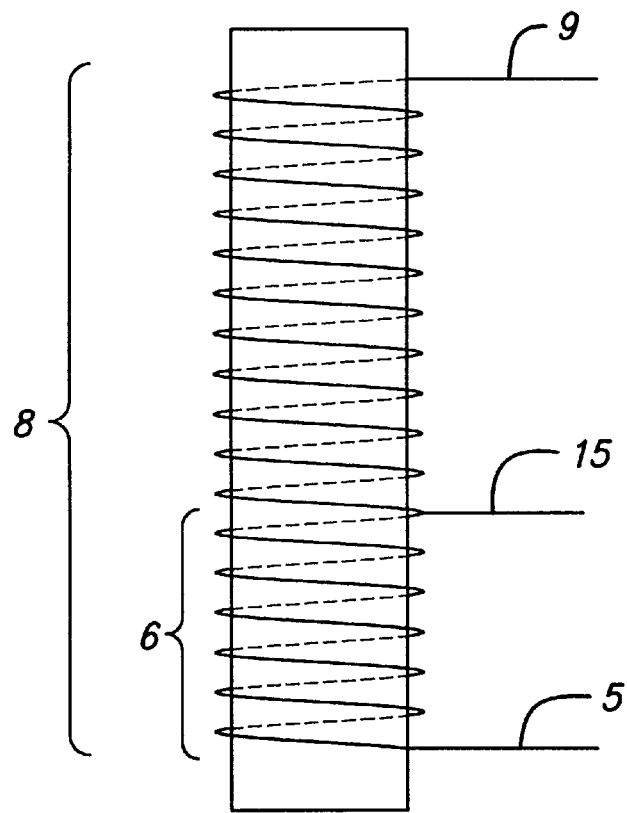
FIG. 5 is a side elevation diagram of the internal ferrite antenna of the embodiment of FIG. 4.

FIGS. 4 and 5 illustrate a very similar, somewhat simpler, and hence preferred embodiment of the system shown in FIGS. 2 and 3. The same reference numerals have been used to indicate the same components. The only significant difference is that winding 6 is connected directly to terminal 15 of ferrite antenna 8, eliminating the separate ground connection 7 shown in FIG. 2. This makes the device more easily manufacturable.

Thus, one embodiment of the invention provides a collar-mounted receiver-stimulator unit having removable external flex antenna 3 and internal ferrite antenna 8 which functions as a short range antenna if external flex antenna 3 is removed. If external flex antenna 3 is attached, then ferrite antenna 8 also cooperates with additional winding 6 to function as a matching transformer coupling external flex antenna 3 to receiver circuit 13, while also acting in cooperation with flex antenna 3 to extend the range of receiver-stimulator unit 16. It has been found that the range with both antennas operative is nearly as great as that of an experimental unit with a double-length external flex antenna but no internal ferrite antenna. It has been found, surprisingly, that in the above described configuration the resonant frequency of the antenna system does not change when the external flex antenna 3 is connected to or disconnected from receiver-stimulator 16. Apparently, the above described combination of the internal ferrite antenna 8, with extra turns coupled to the external flex antenna 3 to function as a matching transformer between the ferrite antenna 8 and the flex antenna 3, prevents the low Q ferrite antenna from being de-tuned by the much higher Q flex antenna.

Referring now to FIG. 6, an electrically conductive coupling element 24 has a threaded section 24A that is screwed into a mounting base 36 (FIG. 7B) of collar-mounted receiver-stimulator unit 16. The coupling element 24 has a groove 30E in its annular flat surface which abuts the threaded mounting base 36 (FIG. 7B) of receiver-stimulator unit 16. A heavy, semi-rigid but slightly flexible piece of wire cable 22 several inches long, wrapped with stainless steel strip material similarly to automotive speedometer cables, is inserted into a precision hole in conductive coupling element 24 and is attached rigidly thereto by a pair of set screws 25 (or possibly by suitable crimping of coupling element 24). The opposite end of cable 22 extends into a conductive metal coupling element 21 and is rigidly attached thereto by a pair of set screws 26 (or possibly by suitable crimping). Coupling element 21 has a reduced diameter portion 21A that extends into a hollow, nonconductive, rigid core on which winding 4 is wound.

The portion of the structure described thus far provides the flexibility needed by flex antenna 3, and also eliminates the unreliability of the solder connection at the lower end of the antenna winding described in the above mentioned U.S. Pat. No. 4,794,402.

According to another aspect of the invention as shown in FIG. 6, the entire structure except the threaded mount 24A is covered with an injection molded plastic sheath or coating generally indicated by numeral 30. One important aspect of the injection molded plastic coating 30 is a symmetrically tapered portion including tapered or cone shaped portions 30A and 30C which narrow down to a minimum diameter portion 30B located at the midpoint of flex cable 22. This has been found to be an important feature that ensures flexing of cable 22 mainly near its midpoint. It has been found that if this double-tapered plastic section of sleeve 30 is not provided, then the cable 22 is much more likely to bend permanently at points located immediately adjacent to base coupling element 24 and/or coupling element 21. The injection molded plastic sheath material 30 can be TEXIN 245 thermoplastic polyurethane material marketed by Bayer Corporation, or ELASTOLLAN 1185A polyether type material.

An important aspect of the structure shown in FIG. 6 is the portion 30E of sheath 30 extending around the annular shoulder of conductive coupling element 24 and into the annular groove 24A. This provides two significant advantages, the first being that it makes it much less likely that the entire plastic covering 30 can be scraped off the rest of the antenna structure by rough behavior of the dog. Another advantage of the structure of FIG. 6 is that the portion extending around to contact the annular portion of coupling element 24 adjacent to threaded portion 24A functions as an "O-ring" against which the flex antenna 3 can be tightened enough that ordinary rubbing of the flex antenna 3 against tree branches, bushes, etc. will not loosen it.

Referring to FIGS. 7A and 7B, plastic cover 32, which can be formed of 30% GR-PBTP glass-filled injection molding plastic material marketed by General Electric under the trademark VALOX, includes elevated ferrite antenna housing 34 that defines an internal cavity 33 within which above described ferrite antenna 8 is mounted. The windings 6 and 8 on insulative core 14 are positioned as shown in FIGS. 7A and 7B and are held in place by ordinary RTV adhesive material, which cushions ferrite antenna 8 from the effects of mechanical impact on flex antenna 3 when the dog runs through brush, etc. Potting cover 54 secures the RTV adhesive and ferrite antenna 8 in place while the RTV adhesive cures. Numerals 52 indicate solder connections of the terminals of winding 8 to conductors 9 and 15, respectively, which have insulative coatings. Preferably, insulated wires 9 and 15 are arranged so that their portions within cavity 33 are collinear, and the portions that extend downward through a hole 54A in a potting cover 52 that covers the bottom of cavity 33 as shown in FIG. 7A are parallel to each other and the portions outside of cavity 33 are perpendicular to the portions thereof in cavity 33, to reduce electromagnetic interference.

Insulated wires 9 and 15 have end terminals which are easily connected to mating terminal conductors of a connector 39 that is connected to the receiver circuit 13 (FIG. 4). Receiver circuit 13 is constructed on a printed circuit board (not shown) that lies parallel to plastic cover 32, in the bottom of metal housing 46. Wire 5 is routed as shown and electrically connected to the conductive center conductor 35 of the conductive base 36 embedded in plastic cover 32 into which removable external flex antenna 3 is connected. (This structure avoids heat stressing of the surrounding plastic material of cover 32 while soldering wire 5 to center conductor 35.) Conductive base 36 and the portion 36A of cover 32 in which conductive base 36 is supported are generally aligned with the longitudinal axes of elevated housing 34 and ferrite antenna 8 therein so that when flex antenna 3 is installed it lies generally in the same plane as ferrite antenna 8. This has been found to maximize the range of receiver-stimulator unit 16 relative to transmitter 14, apparently because the field pattern of ferrite antenna 8 includes "null" regions in which flex antenna 3 has been placed such that flex antenna 3 does not enlarge such null regions.

Reference numerals 50A designate the mounting connectors by means of which insulative probes 50 (FIG. 1) are attached to receiver-stimulator unit 16. Mounting connectors 50A receive the high voltage output signals 55 (FIG. 4) produced by a high voltage output stage of receiver circuit 13, generally in accordance with the above mentioned U.S. Pat. Nos. 4,794,402 and 4,802,482. Plastic cover 32 is attached to the top of magnesium housing 46 by screws (not shown) and sealed thereto by means of a pre-shaped O-ring (not shown) in O-ring groove 49.

Thus, the circuit and structure of FIGS. 2–5 provides an efficient antenna circuit that allows the dog trainer the option of either using an external flex antenna to extend the range of a collar mounted receiver-stimulator unit or removing the external flex antenna when the training exercise will be within a closer range. The option of removing the flex antenna for short-range training is a significant advantage, because external flex antennas often are damaged for the reasons described earlier (e.g., large, strong dogs running through thick brush which strikes the external flex antennas, one dog chewing on the external antenna on another dog, etc.) and must be replaced at substantial cost. The described efficient antenna circuit is provided using fewer components occupying less space than would usually be required to combine two basically different antennas. This substantially reduces the cost of the system and avoids "detuning" which would ordinarily occur when two very different antenna structures are combined.

The improved flex antenna structure of FIG. 6 provides a lower cost, completely waterproof, much more durable, much more reliable flex antenna than the prior art of FIG. 8, by using the sheath material and tapered section thereof to force the flex point of the internal flex cable to occur at a location that does not result in unreliable electrical connection of the ends of the flex cable to the mounting and antenna coils.

While the invention has been described with reference to several particular embodiments thereof, those skilled in the art will be able to make the various modifications to the described embodiments of the invention without departing from the true spirit and scope of the invention. It is intended that all elements and steps which are insubstantially different or perform substantially the same function in substantially the same way to achieve the same result as what is claimed are within the scope of the invention. For example, sheath 30 might possibly be provided by a shrink-wrap technique or by spraying and curing multiple layers of plastic onto the underlying structure.

What is claimed is:

1. An antenna system for a receiver circuit, comprising:
   (a) a conductive antenna mounting connector for detachable connection of an external antenna to the receiver circuit;
   (b) a ferrite core;
   (c) a first winding having a first number of turns about the ferrite core, a first terminal coupled to an antenna input terminal of the receiver circuit, and a second terminal coupled to a first ground conductor;
   (d) a second winding adjacent to the first winding and having a second number of turns about the ferrite core, a first terminal coupled to the conductive antenna mounting connector, and a second terminal coupled to a second ground conductor;
   (e) the first winding functioning as a ferrite antenna; and
   (f) the first and second windings together functioning as a matching transformer coupled between the receiver antenna input terminal of the receiver circuit and an external antenna connected to the antenna mounting connector.

2. The antenna system of claim 1 wherein the longitudinal axis of the ferrite core is co-planar with a longitudinal axis of the external antenna.

3. The antenna system of claim 1 wherein the external antenna is a high Q antenna.

4. An antenna system for an electronic animal training apparatus including a collar-mounted receiver-stimulator unit including a receiver circuit, the antenna system comprising:
   (a) a conductive antenna mounting connector for detachable connection of an external antenna to the receiver-stimulator unit;
   (b) a ferrite core;
   (c) a first winding having a first number of turns about the ferrite core, a first terminal coupled to an antenna input terminal of the receiver circuit, and a second terminal coupled to a first ground conductor;
   (d) a second winding adjacent to the first winding and having a second number of turns about the ferrite core, a first terminal coupled to the conductive antenna mounting connector, and a second terminal coupled to a second ground conductor;
   (e) the first winding functioning as a ferrite antenna; and
   (f) the first and second windings together functioning as a matching transformer coupled between the receiver antenna input terminal of the receiver circuit and an external antenna connected to the antenna mounting connector.

5. The antenna system of claim 4 wherein the external antenna is a flex antenna.

6. The antenna system of claim 5 wherein the external antenna is a high Q antenna.

7. The antenna system of claim 5 wherein the external external antenna is a top loaded antenna.

8. The antenna system of claim 4 wherein the first and second ground conductors are electrically connected together.

9. The antenna system of claim 7 wherein the second winding overlaps a portion of the first winding.

10. The antenna system of claim 9 wherein the first winding includes approximately 11 turns and the second winding includes approximately 3 turns.

11. The antenna system of claim 4 wherein the second winding does not overlap a portion of the first winding.

12. The antenna system of claim 4 wherein the longitudinal axis of the ferrite core is co-planar with a longitudinal axis of the external antenna.

13. An antenna system for an electronic animal training apparatus including a collar-mounted receiver-stimulator unit including a receiver circuit, the antenna system comprising:
   (a) a conductive antenna mounting connector for detachable connection of an external flex antenna to the receiver-stimulator unit;
   (b) a ferrite core;

(c) a first winding having a first number of turns about the ferrite core, a first terminal coupled to an antenna input terminal of the receiver circuit, and a second terminal coupled to a first ground conductor;

(d) a second winding having a second number of turns about the ferrite core, a first terminal coupled to the conductive antenna mounting connector, and a second terminal coupled to a second ground conductor;

(e) the first winding functioning as a ferrite antenna; and (f) the first and second windings together functioning as a matching transformer coupled between the receiver antenna input terminal of the receiver circuit and an external antenna connected to the antenna mounting connector, wherein the external flex antenna includes
  i. a conductive mounting element having a conductive connecting/disconnecting structure for connecting and disconnecting the flex antenna to and from the antenna mounting connector;
  ii. a piece of flex conductor having a first end and a second end, the first end being attached to the conductive mounting element;
  iii. a conductive coil support having a first end attached to the second end of the piece of flex conductor, and a second end;
  iv. an insulative rod having a first end attached to the second end of the conductive coil support, and a second end;
  v. an antenna coil wire wound about the insulative rod and having a free end located near the second end of the insulative rod, and a connected end located near the first end of the insulative rod and electrically attached to the conductive coil support; and
  vi. a molded insulative waterproof sheath disposed on the entire flex antenna except an exposed portion of the conductive connecting/disconnecting structure, wherein the sheath includes a cylindrical first portion of a first diameter disposed around the conductive coil support, the insulative rod, and the antenna coil wire, and a second portion of diameter which gradually decreases from the first diameter to a second diameter and then increasing to a third diameter, the second diameter being generally at a midpoint of the flex conductor to confine flexing thereof generally to the midpoint of the flex conductor.

14. The antenna system of claim 13 wherein the sheath is composed of injection molding material.

15. An antenna system for an electronic animal training apparatus including a collar-mounted receiver-stimulator unit including a receiver circuit, the antenna system comprising:

(a) a conductive antenna mounting connector for detachable connection of an external flex antenna to the receiver-stimulator unit;

(b) a ferrite core;

(c) a first winding having a first number of turns about the ferrite core, a first terminal coupled to an antenna input terminal of the receiver circuit, and a second terminal coupled to a first ground conductor;

(d) a second winding having a second number of turns about the ferrite core, a first terminal coupled to the conductive antenna mounting connector, and a second terminal coupled to a second ground conductor;

(e) the first winding functioning as a ferrite antenna; and (f) the first and second windings together functioning as a matching transformer coupled between the receiver antenna input terminal of the receiver circuit and an external antenna connected to the antenna mounting connector, wherein the collar-mounted receiver-stimulator unit includes
  i. a metal container having the receiver circuit therein, the metal container having an open top;
  ii. a plastic cover attached to cover the open top, the plastic cover having therein an elevated recess disposed substantially above an upper edge of the metal container;
  iii. the ferrite antenna being disposed in the elevated recess, the first winding having a first number of turns about the ferrite core and first and second terminals coupled to first and second terminals of the receiver circuit, the plastic cover and ferrite core therein allowing reception of rf signals by the receiver circuit.

16. The antenna system of claim 15 wherein the collar-mounted receiver-stimulator unit of claim 7 includes the conductive antenna mounting connector for detachable connection of the external antenna to the receiver-stimulator unit, the second winding having a first terminal coupled to the conductive antenna mounting connector and a second terminal coupled to the second terminal of the first winding, so that the first winding and ferrite core function as the ferrite antenna and the first and second windings and the ferrite core together functioning as the matching transformer.

17. A method of providing reliable short range reception and reliable long range reception for a receiver circuit, comprising the steps of:

(a) providing a conductive antenna mounting connector for detachable connection of an external antenna to the receiver circuit, a ferrite core, a first winding having a first number of turns about the ferrite core, a first terminal coupled to an antenna input terminal of the receiver circuit, and a second terminal coupled to a first ground conductor, the first winding functioning as a ferrite antenna;

(b) providing a second winding adjacent to the first winding and having a second number of turns about the ferrite core, a first terminal coupled to the conductive antenna mounting connector, and a second terminal coupled to a second ground conductor; and (c) connecting the external antenna to the conductive antenna mounting connector, the first and second windings together functioning as a matching transformer coupled between the receiver antenna input terminal of the receiver circuit and an external antenna connected to the antenna mounting connector to extend the receiving range of the receiver circuit.

18. The method of claim 17 including aligning the longitudinal axis of the ferrite core to be co-planar with a longitudinal axis of the antenna.

* * * * *